United States Patent [19]

Hanlon

[11] Patent Number: 4,491,881

[45] Date of Patent: Jan. 1, 1985

[54] CALIBRATED DROP-OUT DISK

[75] Inventor: Brian Hanlon, Woodview Park, Ireland

[73] Assignee: Verbatim Corporation, Sunnyvale, Calif.

[21] Appl. No.: 344,766

[22] Filed: Feb. 1, 1982

[51] Int. Cl.³ .................... G11B 27/36; G11B 15/02; G11B 5/09

[52] U.S. Cl. ........................ 360/31; 360/25; 360/53

[58] Field of Search ............... 360/53, 25, 31, 46

[56] References Cited

U.S. PATENT DOCUMENTS 3,947,875 3/1976 Bull et al. .................. 360/39

OTHER PUBLICATIONS

"Checking Error-Correcting and Amplitude Sensing Circuitry"—Breitenback et al., IBM TDB, vol. 12, #7, 12/79.
"Read-Channel Test Circuit"—H. Sierra, IBM TDB, vol. 19, #5, 10/76.
"Apparatus for Generating Desired Physical Defects on Magnetic Disks"—Jones et al., IBM TDB, vol. 23, #2, 7/80.

Primary Examiner—Vincent P. Canney
Attorney, Agent, or Firm—Thomas E. Schatzel

[57] ABSTRACT

A standardized, calibrated drop-out disk is provided to test disk certification equipment. The disk is a previously certified high quality disk having one or more selected tracks thereon upon which data is recorded at a standard level over some portions of the track and at differing levels on other portions of the track known as drop-out portions. The magnitude and playback amplitude of the drop-out portions is selected to be less than that of the remaining portions of the track. Methods of creating the standardized drop-out disk utilizing either varying write currents delivered to the head for the different portions of the track and/or write heads of different width being utilized are also provided. The standardized drop-out disks are utilized to test the sensitivity and accuracy of disk certification equipment as it is used to test production of magnetic disks.

13 Claims, 3 Drawing Figures

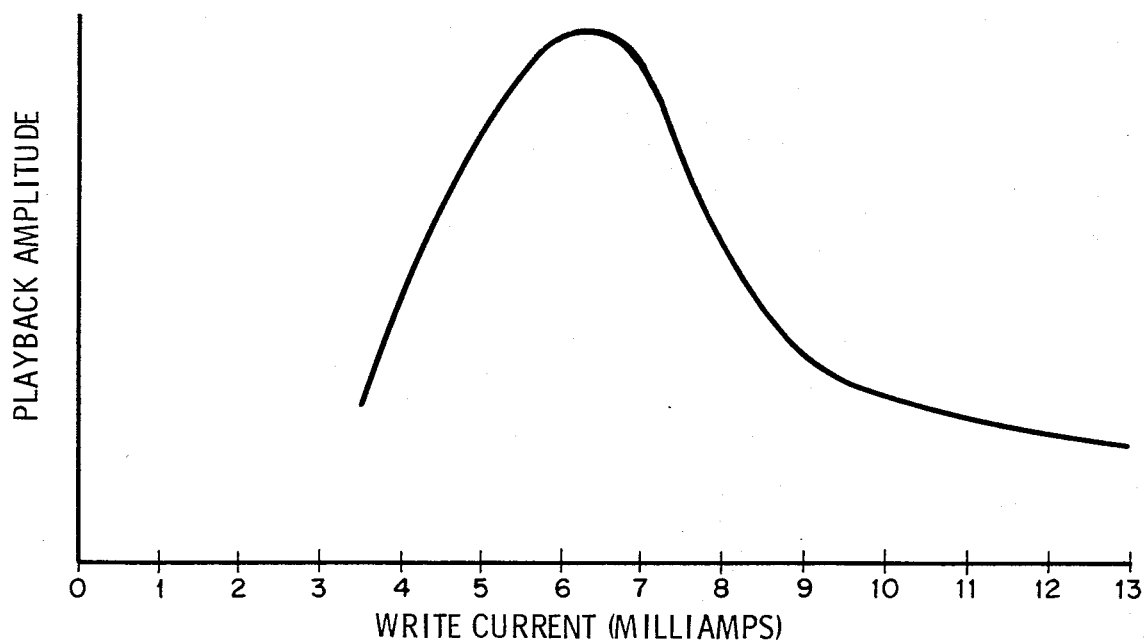
Fig_1
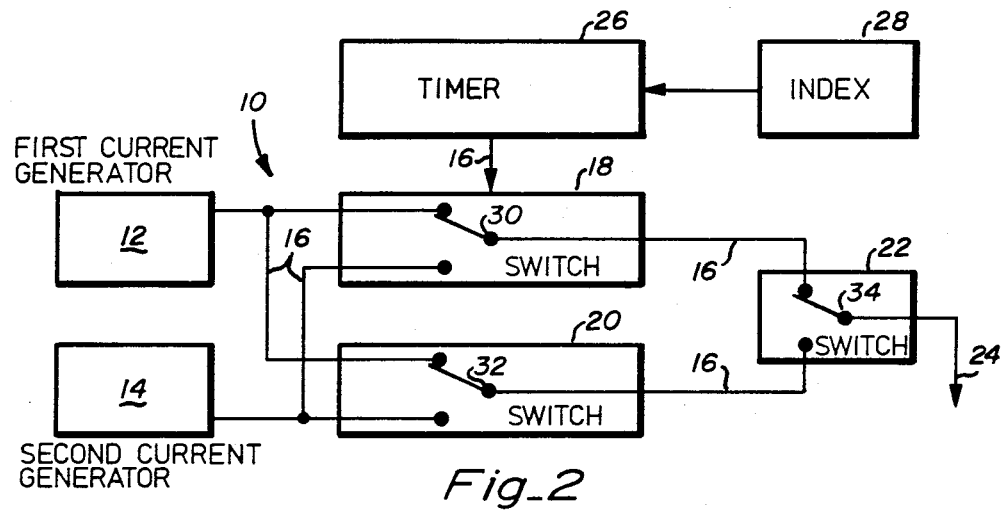
Fig_2
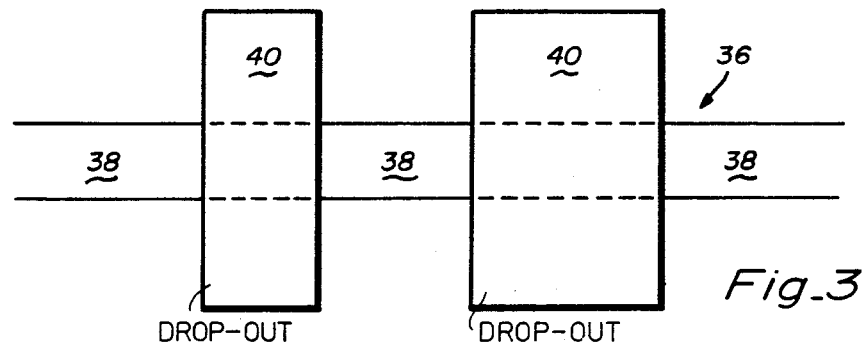
Fig_3

CALIBRATED DROP-OUT DISK

TECHNICAL FIELD

The present invention relates generally to data processing test equipment and more specifically to magnetic media certification.

BACKGROUND ART

The "information explosion" which has inundated the modern world has resulted in the necessity of providing compact methods of information storage. Although miniaturized photo reproduction techniques such as microfilm and microfiche have wide spread uses for archival storage, the temporary and re-usable storage utilizations have been taken over almost entirely by magnetic storage media. The magnetic media include tapes, disks, drums, cards and badges. The information is recorded on the media by altering the direction of magnetization of the ferrimagnetic or ferromagnetic coatings on the medium surface.

Data ordinarily recorded on magnetic media, and particularly upon magnetic disks, is required to be accurate. Modern computer and data processing systems require accurate retrieval of information from the disks in order to function properly. A small error in the retrieval of data may lead to a multiplicity of major errors in the finished result.

Consequently, it is necessary to test recording media and data transfer equipment to eliminate errors resulting from faulty data storage or a retrieval. Various techniques, methods and devices have been developed to test magnetic media for errors.

One method of testing magnetic tape for data omissions or "drop-outs" is disclosed in U.S. Pat. No. 3,525,930, issued to F. J. Hodge. This patent discloses a device designed to test magnetic tapes for drop-outs. This sort of device is known as a tape certifier. Another tape certifying device is disclosed in U.S. Pat. No. 3,947,875, issued to F. W. Bull et al. The tape test device disclosed by Bull relates to a spiral track testing apparatus which tests for drop-outs as well as many other characteristics.

Drop-out testing methods specifically related to magnetic disks are described in U.S. Pat. No. 3,781,835, issued to C. N. Dion et al. and in U.S. Pat. No. 3,686,682, issued to M. I. Behr et al. Both of these patents disclosed test apparatus for certifying magnetic disks as well as methods of utilizing the apparati. Both the Behr and Dion methods contemplate utilizing a portion of the test apparatus to record specified signals on the recording medium and then immediately reading those signals to test whether the medium has properly accepted the data. In this manner, the drop-out points on the medium may be recognized.

However, no adequate safeguards are provided against failures in the certification devices as opposed to those in the recording medium. There is no presently utilized method of adequately certifying the certifiers.

DISCLOSURE OF INVENTION

It is therefore an object of the present invention to provide a calibrated drop-out technique for testing magnetic recording media certification equipment.

It is another object of the present invention to provide a calibrated drop-out disk with specified drop-out levels and locations for precise calibration of certification equipment.

Briefly, a preferred embodiment of the present invention is a calibrated drop-out disk in which a previously certified magnetic disk is treated such that recording tracks thereon include data drop-outs of known magnitude and location. The invention further includes methods of creating the calibrated drop-out disk by recording a specified track on the disk such that the selected drop-out positions have data recorded thereon at a significantly lower magnitude than the remainder of the track. These methods include utilizing a higher than optimum write current for the drop-out portions or utilizing a wider write head in the drop-out portions.

An advantage of the present invention is that magnetic disk certification equipment can be precisely calibrated and tested using the calibrated drop-out disk.

Another advantage of the present invention is that a highly accurate calibrated drop-out disk may be manufactured quickly and economically.

These and other objects and advantages of the present invention will no doubt become clear to one skilled in the art upon reading the following detailed description of the preferred embodiments which are illustrated in the several figures of the drawing.

BRIEF DESCRIPTION OF DRAWINGS

FIG. 1 is a graphical representation of the magnitude of the playback signal as a function of the write current delivered to the head during recording of the disk;

FIG. 2 is a schematic diagram of a method for manufacturing a calibrated drop-out disk; and FIG. 3 is a representation of a portion of a recording track manufactured using an alternate method of manufacture.

BEST MODE FOR CARRYING OUT INVENTION

The present invention is a disk for calibrating magnetic media certifiers to read a correct magnitude of drop-outs. Such a disk is in the nature of an ordinary magnetic disk for use with electronic data transcribing equipment. The disk itself may be any commercially available high quality magnetic disk. It may be selected to be rigid or flexible and may be of any construction or material that is suitable for recording and retrieval of magnetic data.

The calibrated drop-out disk is intended for use with disk certification equipment. The type of disks to be utilized with the certification equipment are those in which data is typically recorded in a series of non-intersecting concentric tracks. These concentric tracks represent the path traced by a magnetic recording/reading head as the disk is spun. Each track represents a specific radial position of the read/write head.

The present invention, a disk which has previously been certified to be free of data drop-outs is subsequently treated such that one or more of the tracks thereon includes data drop-outs in specific numbers and magnitudes and situated at specified locations. A data drop-out is a position wherein data which has been recorded on the disk is retained on the medium in insufficient magnitude for complete retrieval by the read head.

The preferred embodiment of the present invention utilizes a flexible magnetic diskette of construction similar to that described in U.S. Pat. No. 3,668,658, issued to Flores, et al. The magnetic disk utilized had a base material of Mylar with a magnetic coating of $\gamma\text{-}Fe_2O_3$ coating. For example, a flexible disk of eight inches in diameter and designed to accept data on approximately seventy-seven tracks when utilized with standard equipment was used. On this disk, track number 60 was arbitrarily selected as the calibration track. Calibration track number 60 was then recorded in accordance with the methods described herein to contain a specified number of drop-out areas at known locations. The number and locations of the drop-outs were then recorded such that the completed disk was fully characterized. The now-calibrated and characterized disk may be used to test certification equipment for proper recognition of drop-outs.

It is important that the track selected for calibration not be written on subsequent to characterization. Therefore, although ordinarily commercially available magnetic media are adequate for the calibrated drop-out disk if care is used with the certification equipment, it may be desirable to utilize magnetic media having higher coercivity values than gamma ferric oxide. Coercivity, or, as it is sometimes called, "magnetic hardness", is a term of art relating to the strength of magnetic field required to reverse the direction of magnetization of a given magnetic material. The gamma ferric oxide ordinarily used in magnetic diskettes has a coercivity of approximately 300 Oersteds. Other magnetic materials, however, have much higher values of coercivity. For example, cobalt-impregnated iron oxide has a coercivity of approximately 600 Oersteds, chromium dioxide has a value of 470 to 600 Oersteds, pure metal particles have coercivities of 1000 to 1200 Oersteds while barium-ferrite ($BaO_6.Fe_2O_3$) and strontium-ferrite ($SrO_6.Fe_2O_3$) have been found to have coercivity values in the range of 2000 to 3000 Oersteds.

The higher the coercivity of the magnetic medium selected for the calibrated drop-out disk the greater the permanency of the data recorded thereon. Thus, a drop-out disk with a high coercivity will reduce the chance that the calibration will be destroyed or altered during subsequent usage. Of course, a high coercivity magnetic material also requires a greater intensity field to record the calibrated track in the first place. Therefore, a balance must be struck between the difficulty in preparing the calibrated disk and the reliability and stability of the disk once prepared.

One method of preparing a calibrated drop-out disk of the present invention is based upon the phenomenon of "recording demagnetization". This phenomenon is based upon a relationship between the write current utilized to record the data on the magnetic medium and the amplitude of playback for that same data. An illustration showing the relationship between the playback amplitude and the write current, expressed in milliamps, for the ordinary commercially available disk described above, is shown in FIG. 1. As FIG. 1 illustrates, the maximum playback amplitude, is achieved on disks of this type when a write current of approximately six to seven milliamps is utilized in a typical head. When the write current exceeds seven milliamps the resultant magnitude is reduced as shown by the curve. Tests have shown that for the same magnetic medium a write current of eleven milliamps will result in a playback amplitude of approximately 40 percent of the playback amplitude of a write current of seven milliamps.

The phenomenon of "recording demagnetization" may be utilized by the apparatus shown in FIG. 2 to prepare a calibrated drop-out disk. The method of manufacture of a calibrated drop-out disk illustrated in FIG. 2 involves recording portions of a selected track on the disk at a high magnitude, such as by recording at a write current of seven milliamps while other portions of the track, known as the "drop-out portions", are recorded to have a lower magnitude, such as by recording at eleven milliamps. In this manner, by controlling precisely which locations on the disk are recorded at seven milliamps and which portions are recorded at eleven milliamps, specified drop-out portions of the disk may be created. The magnitude at the preselected drop-out portions will be approximately 40% of the magnitude of the remainder of the track. On certification equipment, these drop-out portions will appear as data drop-outs and thus as faults in the disk.

FIG. 2 illustrates, in schematic representation, a disk recording apparatus 10. The disk recording apparatus 10 is adapted for selectively recording drop-out portions on the disk.

The disk recording apparatus includes a first current generator 12 and a second current generator 14. The electrical impulses generated by first generator 12 and the second current generator 14 are carried throughout the apparatus 10 by an electrical network 16. Both of the current generators are connected by the network 16 to an automatic switching mechanism 18 and a manual switching mechanism 20. Each of the switching mechanisms is capable of providing an output corresponding to the signal received from either the first current generator 12 or the second current generator 14.

The outputs of the automatic switching mechanism 18 and the manual switching mechanism 20 are delivered by network 16 to a modal switching mechanism 22. The modal switching mechanism 22 selects between the outputs of the automatic switching mechanism 18 and the manual switching mechanism 20 for current delivery to the write head connector 24. Current delivered to the write head connector 24 will be directly delivered to the disk write head of the apparatus which will transcribe data onto the disk.

The operation of the automatic switching mechanism 18 is controlled by a timer 26. Timer 26 which is connected to an index 28 selects the timing of the switching of an automatic switch 30 within the automatic switching mechanism 18. Automatic switch 30 is a two position switch which may either connect the output of the automatic switching mechanism 18 with the signal from first current generator 12 or with the signal from second current generator 14. A signal to the automatic switching mechanism 18 from timer 26 will cause the automatic switch 30 to alter its position from one position to the other. This results in the output being altered at a precise time as determined by the timer. The index 28 provides an origin position to the timer 26 by photoelectrically or otherwise sensing the index position on the disk and signalling the timer upon sensing. Thus, the origin point on the disk is identified and all recording activity is based upon that specified origin. This guarantees reproducibility of the calibrated disk and ready location of the specified positions on the track. The interaction of the index 28 and the timer 26 provide the precise timing of the alteration of automatic switch 30.

It is desirable that a precise record be made as to which portions of the track are recorded with the automatic switch 30 connected to the first current generator 12 and which portions are connected to the second current generator 14. This may be accomplished by having the timer signal a recording device simultaneously with the signal to the automatic switching mechanism 18 or by later testing of the signal strength as the track is read. The position of the drop-outs may be recorded as a function of time from origin or, more commonly, as a function of degrees of displacement from index on the track.

Manual switching mechanism 20 includes a manual switch 32 which is substantially similar to the automatic switch 30 in that it is a two position switch connecting the output to either the first current generator 12 or the second current generator 14. Manual switch 32 may be manually operated to select between the current generators.

Modal switching mechanism 22 includes a mode switch 34. Mode switch 34 is also a two position switch which selects between the output of the automatic switching mechanism 18 and the output of the manual switching mechanism 20 to determine which current will be delivered to the write head connector 24 and subsequently to the write head for recording on the disk.

The current delivery values of the first current generator 12 and the second current generator 14 are selected to be different. For example, in one method of operation of the apparatus the first current generator 12 would be selected to deliver a current of approximately seven milliamps while the second current generator 14 would be selected to deliver a write current of eleven milliamps. When the values are thus selected and the mode switch 34 is connected to the output of the automatic timing mechanism 18 the playback amplitude of the disk will be at a normal amplitude when the automatic switch 30 is connected to the output of first current generator 12 and at approximately forty percent of normal amplitude (as shown in FIG. 1) when the automatic switch 30 is connected to the output of second current generator 14. The operation of timer 26 and index 28 controls the switching of automatic switch 30. This operation may be recorded such that a precisely known calibrated drop-out disk is prepared with drop-out portions having play-back amplitudes of forty percent of the remaining portions of the disk.

Similarly, if desired, the mode switch 34 may be connected to the output of the manual switching mechanism 20. In this mode the operator may manually select which current to place in the circuit and thus may custom create a drop-out disk to whatever specifications desired.

The relationship between the normally recorded portions of the disk and the drop-out portions of the disk may be controlled by manipulation of the magnitude of the outputs of first current generator 12 and second current generator 14. As is shown in the curve of FIG. 1, the playback amplitude is very dependent on this relationship. For example, if a true and total drop-out is desired, second current generator 14 may be a zero value component. In such a case, no write current whatever would be delivered to the write head and there would be no playback amplitude. On the other hand, if first current generator 12 is selected to have a value of seven milliamps and second current generator 14 is selected to have a value of 7.5 or eight milliamps then only a very slight modification in the expected playback amplitude will result. It may also be desirable to utilize a variable current generator to produce several different magnitudes of drop-outs on the same track. Varying magnitudes of drop-out portions may be used to test the sensitivity of the certification equipment. In order to avoid errors in radial location of the read head in the certification equipment, it may be desirable to utilize an overwide write head when recording the standardized calibrated drop-out disk by the "recording demagnetization" method. This will result in an extra-wide track. In this manner, a slight error in the radial positioning of the read head on the certifier will not result in a misreading of the calibrated track.

FIG. 3 illustrates, in schematic representation, a portion of a track on a magnetic disk which has been recorded utilizing an alternate method of producing standardized drop-outs. In this illustration, the track 36 includes a plurality of normally recorded portions 38 and a plurality of drop-out portions 40. The illustration shows the drop-out portions as being significantly wider on the track than are the normally recorded portions 38. This represents that the drop-out portions 40 are recorded utilizing a wider write head than are the normally recorded portions 38.

A track of the sort illustrated in FIG. 3 may be accomplished by recording the track utilizing a first write head to record the entire track at a normal magnitude, thus creating the normally recorded portions 38 over the entire track. Subsequently, a second write head, significantly wider than the first, is used to rerecord selected portions of the track 36. If the same magnitude write current signal is delivered to the second write head as was delivered to the first write head then the ratio of the data density in the drop-out portions 40 to the density in the normally recorded portions 38 is the inverse of the ratio of the widths of the second write head to the first write head. This result is obtained because the same amount of data is dispersed over a wider area in the drop-out portions than it is in the normal portions 38. When the second write head creates the drop-out portions 40 it will first erase the data previously recorded by the first write head. Thus, there is no dual recording of the drop-out portion 40 over a normally recorded portion 38.

Again, as in the apparatus of FIG. 2, the method of FIG. 3 may be utilized to create drop-out portions 40 of various data density relationships to the normally recorded portions 38. By selected the width of the second write head in comparison to that of the first write head, drop-outs of varying degrees may be created to test the acuity and sensitivity of the certification apparatus.

Although the present invention has been described above in terms of the presently preferred embodiments, it is to be understood that such disclosure is not to be interpreted as limiting. Accordingly, it is intended that the appended claims be interpreted as covering all alterations and modifications as fall within the true spirit and scope of the invention.

I claim:

1. A standardized recording medium with calibrated data drop-out characteristics, comprising:
   a base film disk substrate;
   a magnetic recording layer on at least one surface of the disk substrate suitable for recording in a plurality of separate tracks; and
   at least one track being provided with at least one preselected segment in which analog signals have been recorded at a selected first magnitude, said preselected segments being bordered by a pair of segments having analog signals recorded at a second magnitude, said second magnitude being greater than said first magnitude, and approximately equal to a normal recording magnitude whereby preselected locations on the track are recorded to have playback amplitude levels significantly lower than the remainder of the track.

2. The recording medium of claim 1 wherein
said first magnitude is selected to be forty percent of said second magnitude.

3. The recording medium of claim 1 wherein
the precise number and locations of said preselected segments are determined and a listing thereof is provided to a user in conjunction with the media.

4. In a flexible magnetic disk provided with a coating of a magnetic recording material and utilized with an apparatus for reading data from the disk in a plurality of separate tracks, the improvement comprising:
prerecording at least one preselected track with at least a first and a second magnetic field level, said second field level being equal to the normal recording magnitude and said first field level being significantly lower than said second field level whereby specified locations on the track are recorded to have playback amplitude levels significantly lower than the remainder of the track; and
determining the precise number and locations of said specified locations of lower playback amplitude and providing a listing thereof by first activating a timer by sensing a signal from a disk index sensing means to said timer, then generating said second magnetic field level for a predetermined period of time while said disk moves relative to a write head, next generating said first magnetic field level for a predetermined period of time while said disk moves relative to said write head, said first field level being generated for a shorter period of time than said second field level, and last generating said second magnetic field level again whereby said specified locations of low playback amplitude are bordered by locations of normal playback amplitude, and said specified locations are recorded as a function of time from said disk index.

5. The improvement of claim 4 wherein
the playback amplitude at said specified locations is selected to be between thirty and sixty percent of the playback amplitude of the remainder of the track.

6. The improvement of claim 4 wherein,
said specified locations are not identical in playback amplitude of each of said specified locations having a single playback amplitude, and the magnitude of playback amplitude of each specified location being selected to be in the range of zero percent to ninety percent of the playback amplitude of the remainder of the track.

7. A method of preparing a standard drop-out magnetic disk for use with disk certifier machines, in steps comprising:
preselecting a recording track on a certified unrecorded disk;
recording analog signals on the preselected track by inducing a second magnetic field level for a portion of the track, said second field level being approximately equal to a normal recording magnitude, then inducing a first magnetic field level, comprising a drop-out, for a preselected known portion, said first field level being significantly lower than said second field level, then inducing said second field level for the next portion of the track whereby a track is formed with known drop-out portions of the track having analog signals recorded at a significantly lower level than the analog signals comprising the remainder of the track.

8. The method of claim 7 wherein
the analog signals are recorded on the preselected track utilizing a first write current for said drop-out portions of the track and a second write current for the remainder of the track.

9. The method of 8 wherein,
the disk includes ferric oxide as the magnetic material and said first write current is selected to be eleven milliamps while said second write current is selected to be seven milliamps.

10. The method of claim 7 wherein,
the magnitude in said drop-out portions is approximately forty percent of the magnitude on the remainder of the preselected track.

11. The method of claim 7 wherein
the analog signals are recorded on the preselected track utilizing a first write head for said drop-out portions and a second write head for the remainder of the track, said first write head writing on a wider track than said second write head, and the magnitude of write current signal is selected to be equal for each head.

12. The method of claim 11 wherein,
said second write head utilizes a track of equivalent width to that read by a read head on the certification equipment with which the calibrating disk is to be utilized.

13. The method of claim 11 wherein,
said first write head writes on a track two-and-one half times as wide as the track written on by said second write head.

* * * * *